United States Patent
Ando et al.

(10) Patent No.: US 8,380,352 B2
(45) Date of Patent: Feb. 19, 2013

(54) ROBOT SYSTEM

(75) Inventors: Shingo Ando, Fukuoka (JP); Yasuyuki Inoue, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 475 days.

(21) Appl. No.: 12/722,535

(22) Filed: Mar. 12, 2010

(65) Prior Publication Data

US 2011/0087374 A1    Apr. 14, 2011

Related U.S. Application Data

(63) Continuation of application No. PCT/JP2008/066202, filed on Sep. 9, 2008.

(30) Foreign Application Priority Data

Sep. 14, 2007  (JP) .................... P. 2007-238914

(51) Int. Cl.
 *B25J 9/02* (2006.01)
(52) U.S. Cl. .......................... 700/260; 901/2
(58) Field of Classification Search .......... 700/260, 700/254, 258, 262; 318/568.15–568.19; 901/2, 9, 14–17, 30, 34
See application file for complete search history.

(56) References Cited

U.S. PATENT DOCUMENTS 4,675,502 A * 6/1987 Haefner et al. ......... 219/124.34
7,881,896 B2 * 2/2011 Atwell et al. ............... 702/95

FOREIGN PATENT DOCUMENTS

| JP | 04-152082 | 5/1992 |
| JP | 06-039760 | 2/1994 |
| JP | 2619227 B2 | 6/1996 |
| JP | 11-042574 | 2/1999 |
| JP | 2003-127079 | 5/2003 |
| JP | 2003-211376 | 7/2003 |
| JP | 2003-216243 | 7/2003 |

* cited by examiner

*Primary Examiner* — Dalena Tran

(74) *Attorney, Agent, or Firm* — Ditthavong Mori & Steiner, P.C.

(57) ABSTRACT

First calculation means calculates a TCP velocity error vector Verr when wrist axes performs rotational following movement, second calculation means selects a component, including the sign, of the TCP velocity error vector Verr, third calculation means decomposes the selected velocity error vector into a joint velocity vector ωerr, fourth calculation means integrates the joint velocity ωerr and calculates a position correction amount vector θadd, and the position correction amount vector θadd is fed back to position control means with torque limits.

18 Claims, 6 Drawing Sheets

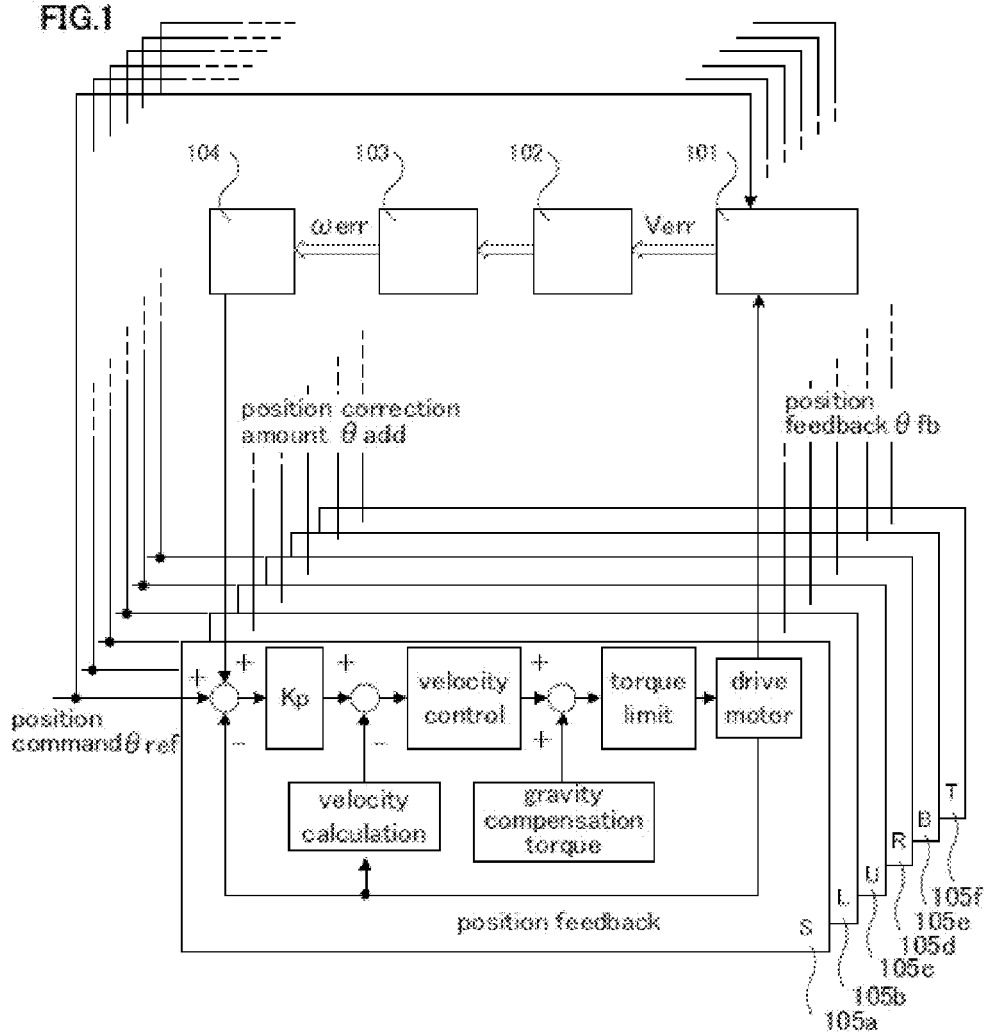

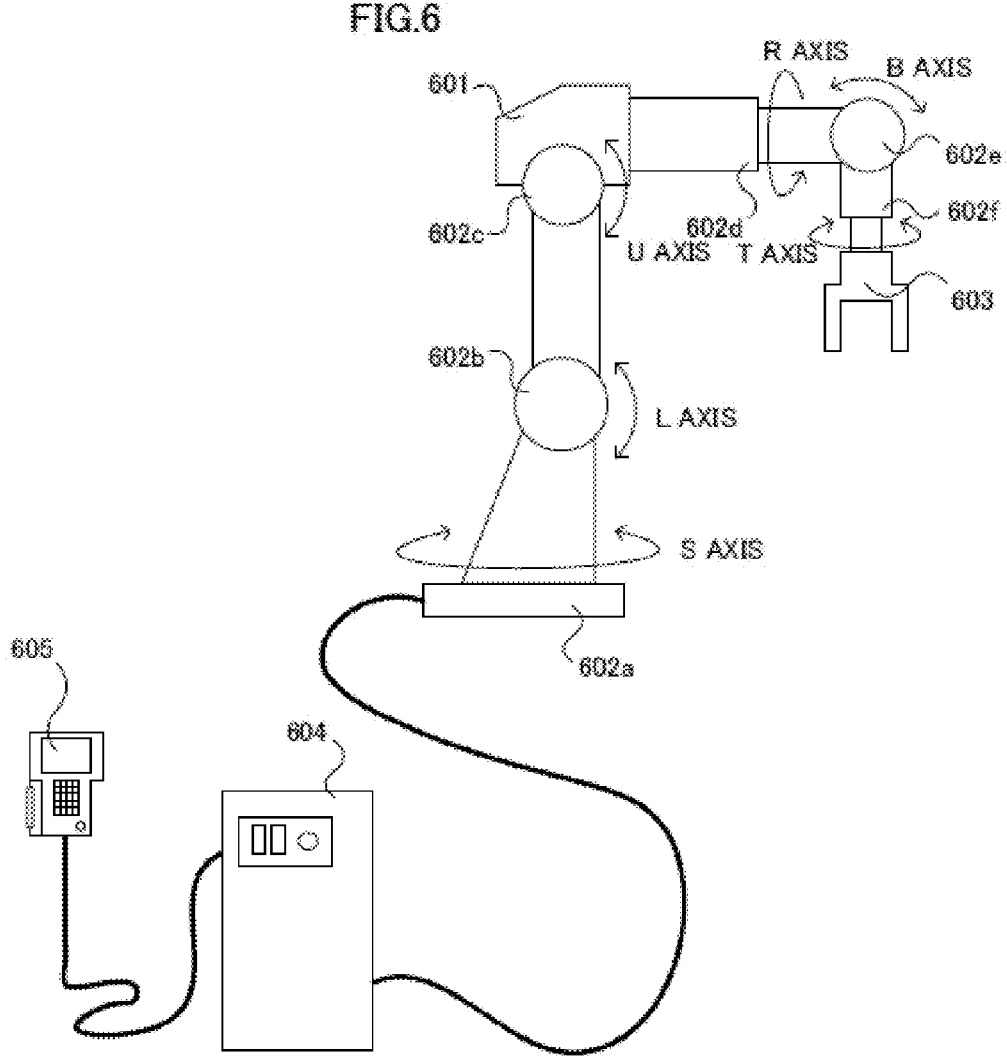

ROBOT SYSTEM

CROSS-REFERENCE TO RELATED APPLICATIONS

The present application is a continuation application of PCT/JP2008/066202, filed Sep. 9, 2008, which claims priority to Japanese Patent Application No. 2007-238914, filed Sep. 14, 2007. The contents of these applications are incorporated herein by reference in their entirety.

BACKGROUND OF THE INVENTION

1. Field of the Invention

The present invention relates to force control of a robot manipulator.

2. Discussion of the Background

When a robot inserts a part into a hole, the part cannot be successfully inserted if the robot opposes an external force that is applied to a robot manipulator. In order to insert the part, the manipulator has to move so as to follow the external force instead of opposing the external force. In general, a manipulator has to include a force sensor for detecting an external force in order that the manipulator can move in such a manner. However, following movement can be performed without using a force sensor. Techniques to make a robot manipulator follow an external force without using a force sensor are disclosed, for example, in Japanese Unexamined Patent Application Publication No. 06-39760.

SUMMARY OF THE INVENTION

According to one aspect of the present invention, a robot system includes a robot including at least main axes and wrist axes; first calculation means for calculating a first velocity error vector of a tip of a tool of the robot, the first velocity error vector being generated as a result of the robot following an external force applied to the tool disposed at an end of the robot; second calculation means for outputting a second velocity error vector, the second velocity error vector including a vector component of the first velocity error vector that has been calculated, the vector component being related to translational movement; third calculation means for decomposing the second velocity error vector that has been output into a joint velocity vector of the main axes; fourth calculation means for calculating a position correction amount vector by integrating the joint velocity vector that has been decomposed; and position control means for controlling positions of drive motors of the robot on the basis of a position command to which the position correction amount vector has been added.

According to another aspect of the present invention, a robot system includes a robot including at least main axes and wrist axes; first calculation means for calculating a first velocity error vector of a tip of a tool of the robot, the first velocity error vector being generated as a result of the robot following an external force applied to the tool disposed at an end of the robot; second calculation means for outputting a second velocity error vector, the second velocity error vector being obtained by selecting a vector component related to rotational movement in the first velocity error vector that has been calculated and by making a magnitude of the selected component zero; third calculation means for decomposing the second velocity error vector that has been output into a joint velocity vector of the main axes and the wrist axes; fourth calculation means for calculating a position correction amount vector by integrating the joint velocity vector that has been decomposed; and position control means for controlling positions of drive motors of the robot on the basis of a position command to which the position correction amount vector has been added.

According to further aspect of the present invention, a robot system includes a robot including at least main axes and wrist axes; first calculation means for calculating a first velocity error vector of a tip of a tool of the robot, the first velocity error vector being generated as a result of the robot following an external force applied to the tool disposed at an end of the robot; second calculation means for outputting a second velocity error vector, the second velocity error vector being obtained by selecting a vector component related to rotational movement in the first velocity error vector that has been calculated and by inverting a sign of the selected component; third calculation means for decomposing the second velocity error vector that has been output into a joint velocity vector of the main axes and the wrist axes; fourth calculation means for calculating a position correction amount vector by integrating the joint velocity vector that has been decomposed; and position control means for controlling positions of drive motors of the robot on the basis of a position command to which the position correction amount vector has been added.

The first calculation means may calculate the first velocity error vector by differentiating, with respect to time, a difference between a position vector calculated from the position command and a position vector calculated from position feedback.

The first velocity error vector calculated by the first calculation means may be a velocity error vector in an orthogonal coordinate system.

According to an embodiment, a force control method for a robot includes calculating a velocity error vector of a tip of a tool, the velocity error vector being generated as a result of the robot including the tool following an external force applied to the tool; correcting the position command on the basis of the velocity error vector; and controlling drive motors of the robot on the basis of the position command that has been corrected.

According to an embodiment, a force control method for a robot includes calculating a velocity error vector of a tip of a tool in an orthogonal coordinate system, the velocity error vector being generated as a result of the robot at least including main axes and wrist axes following an external force applied to the tool; decomposing the velocity error vector into a joint velocity vector with respect to the main axes and the wrist axes; calculating a position correction amount vector by integrating the joint velocity vector with respect to time; and correcting a position command of drive motors of the robot by using the position correction amount vector.

According to an embodiment, in the force control method for a robot, the velocity error vector is calculated by differentiating, with respect to time, a difference between a position vector calculated from the position command and a position vector calculated from position feedback, the position vectors extending from a wrist point of the wrist axes to the tip of the tool.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of a force control method for a robot according to the present invention;

FIG. 6 is a diagram of a controller of a general industrial robot.

DESCRIPTION OF THE EMBODIMENTS

Figure 2A:
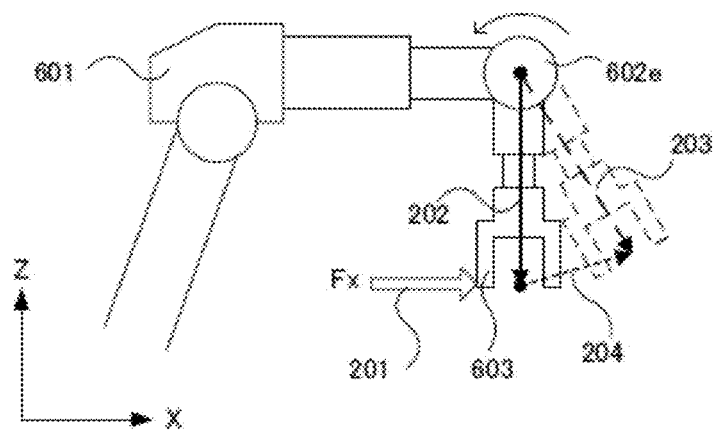
FIGS. 2A to 2C illustrate the operation principle of a force control method for a robot according to the present invention.

According to the present invention, translational following movement of a wrist point is performed by feeding back, to main axes, the movement of a TCP (hereinafter referred to as "TCP") owing to rotational following movement of wrist axes having a low static friction, so that the TCP can be made to linearly follow even a small external force. Therefore, a fitting operation can be realized without using a force sensor. A stable control system can be established because drive motors of the wrist axes are in open loop states when following movement is performed. Moreover, a collision force in a fitting direction can be absorbed by the torque limits of the axes, so that generation of an excessive force in a direction other than the following direction (fitting direction) is prevented.

Change in the orientation of the TCP during translational following movement can be decreased, so that a moment applied to the robot during the fitting operation can be reduced and a more precise fitting operation can be realized.

Hereinafter, an embodiment according to the present invention will be described.

FIG. 6 is a diagram of a general industrial robot. In FIG. 6, a robot 601 is a six-degree-of-freedom manipulator that has joint axes 602a to 602f. Each of the joint axes 602a to 602f includes a drive motor with an encoder, and the joint axes can be independently moved. The joint axes 602a to 602f are called the S, L, U, R, B, and T axes, respectively. The S, L, and U axes are called main axes. The R, B, and T axes are called wrist axes. The main axes determine the position of a wrist point (the intersection of the rotation axes R, B, and T). The wrist axes determine the orientation of a tool (hand) 603. A controller 604 of the robot 601 includes control means for performing feedback on the basis of encoder signals of the drive motors of the axes, and controls the movement of the drive motors. A teach pendant 605 is an apparatus with which a user operates the robot, edits a movement program, and teaches the movement program to the robot.

Hereinafter, an embodiment in which the present invention is applied to the above-mentioned six-degree-of-freedom manipulator will be described. However, as long as the manipulator includes main axes and wrist axes, the manipulator may have any degree of freedom. The present invention can be similarly applied to a manipulator having a degree of freedom greater than six.

First Embodiment

FIG. 1 is a control block diagram of a force control method for a robot according to the present invention.

In FIG. 1, first calculation means 101 calculates a first velocity error vector of the tip of the tool. The first velocity error vector is generated as a result of the robot following an external force applied to the tool. To be specific, the first calculation means 101 calculates a velocity error vector of the tip of the tool (Tool Center Point, hereinafter referred to as "TCP") in an orthogonal coordinate system, which is a TCP velocity error vector (first velocity error vector) Verr, on the basis of a position command and position feedback. The first calculation means 101 is a calculator. This calculator can be implemented in, for example, an adder or software executed by a CPU.

Second calculation means 102 outputs a second velocity error vector that includes vector components of the first velocity error vector that has been calculated, the vector components being related to translational movement. The second calculation means 102 calculates, as described below, the second velocity error vector by multiplying the TCP velocity error vector Verr, which has been calculated by the first calculation means 101, by a selection matrix. The second calculation means 102 is a calculator. This calculator can be implemented in, for example, a multiplier or software executed by a CPU.

Third calculation means 103 decomposes the second velocity error vector, which has been output, into a joint velocity vector of the main axes. As described below, the third calculation means 103 decomposes the second velocity error vector into a velocity error vector (joint velocity vector) ωerr in the joint space of the robot 601 and outputs the velocity error vector ωerr. The third calculation means 103 is a calculator. This calculator can be implemented in, for example, a multiplier or software executed by a CPU.

Fourth calculation means 104 integrates the joint velocity vector that has been output and calculates a position correction amount vector. The fourth calculation means 104 calculates a position correction amount vector θadd by integrating the joint velocity error vector ωerr, and outputs the position correction amount vector θadd. The fourth calculation means 104 is a calculator. This calculator can be implemented in, for example, an integrator or software executed by a CPU.

Position control means 105a to 105f control the positions of the drive motors of the robot on the basis of the position command. The position control means 105a to 105f are provided for the drive motors of the S, L, U, R, B, and T axes (602a to 602f), respectively. Each position control means has a function of compensating for gravitational moment and a torque limiting function for limiting the torque generated by the drive motor. Although FIG. 1 specifically illustrates only the position control means of the S axis, the position control means of the other axes have the similar structure. When an external force is applied to a link of the robot 601 and the disturbance torque (moment) of a joint axis reaches the torque limit, the joint axis rotates in the direction of the disturbance torque so as to follow the disturbance torque. The position control means 105a to 105f are position controllers. Each position controller can be implemented in, for example, an adder and a multiplier. Alternatively, the position controller can be implemented in software executed by a CPU.

Referring to FIGS. 1 and 2, how the robot reacts to an external force will be described.

Figure 2B:
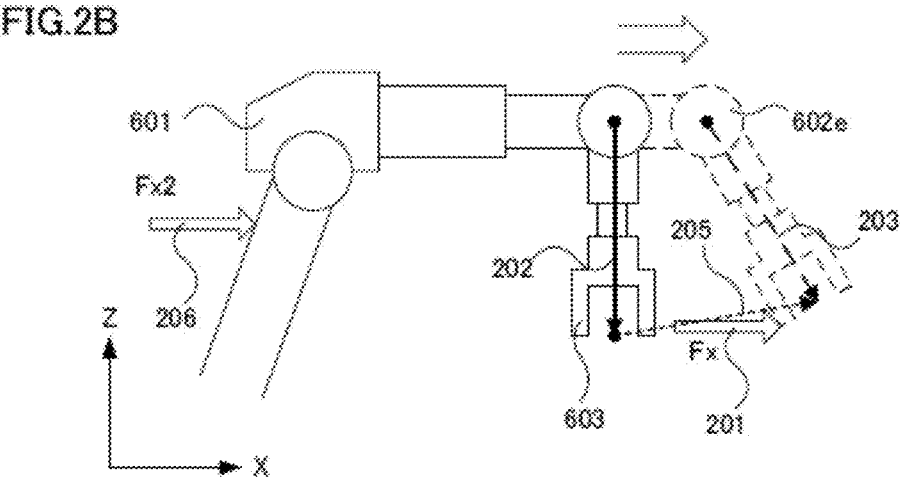
Figure 2C:
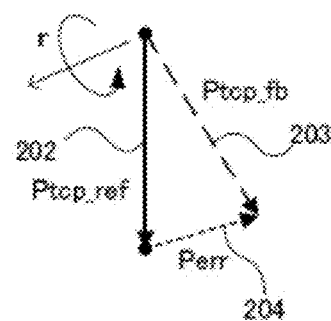

FIGS. 2A to 2C illustrate the operation principle of a force control method for a robot according to the present invention.

As illustrated in FIG. 2A, when an external force Fx (201) is applied to the tip of the tool 603 in the direction of the X axis, a wrist axis 602e (B axis), which has a static friction lower than that of the main axes (S, L, and U axes), reaches the torque limit and the B axis follows the external force (rotates in accordance with the external force). A TCP position vector Ptcp_ref 202 is calculated from the position command. A TCP position vector Ptcp_fb 203 is calculated from the position feedback (the present position resulting from following movement). An error Perr 204 between the TCP position vectors Ptcp_fb 203 and Ptcp_ref 202 is calculated using the following equation.

$$Perr = Ptcp\_fb - Ptcp\_ref \quad (1)$$

The first calculation means 101 calculates the error Perr 204 between the TCP position vectors, and differentiates the error Perr 204 with respect to time so as to obtain the TCP velocity error vector Verr. In the first embodiment, the TCP velocity error vector Verr is a three-dimensional vector representing only the translation (three degrees of freedom in position), and three degrees of freedom in orientation is not considered.

$$Verr = [vex, vey, vez]^T \quad (2)$$

The superscript T represents the transpose of a vector or a matrix.

The second calculation means 102 multiplies the TCP velocity error vector Verr by a selection matrix, which is a 3×3 (three row by three column) matrix represented by equation (3), from the left.

$$Msel = [I33] \quad (3)$$

Here, I33 is a 3×3 unit matrix. The result of the calculation is a second velocity error vector.

The third calculation means 103 calculates a Jacobian matrix J33 (3×3 matrix) for the wrist point with respect to the main axes (S, L, and U axes). The third calculation means 103 multiplies the second velocity error vector by the inverse matrix of the Jacobian matrix J33 so as to calculate the velocity error vector (joint velocity vector) ωerr in the joint space as follows.

$$\omega err = inv(J33) \cdot Msel \cdot Verr \quad (4)$$

The notation inv(X) represents the inverse matrix of a square matrix X.

The fourth calculation means 104 integrates the velocity error vector ωerr in the joint space with respect to time so as to calculate the position correction amount vector θadd.

When the components of the position correction amount vector θadd are added to the position command θref of the position control means of the S, L, and U axes in FIG. 1, the wrist point moves in a straight line so as to follow the TCP velocity error vector Verr (translational following movement) as illustrated in FIG. 2B.

The initial points of the TCP position vectors 202 and 203 are the wrist point and the terminal points of the TCP position vectors 202 and 203 are the TCP. As illustrated in FIG. 2C, the error vector 204 is always calculated in a state in which the initial points coincide with each other. Alternatively, the TCP velocity error vector Verr can be calculated simply by differentiating a TCP position error 205, which is viewed from the origin of the robot coordinate, with respect to time. However, caution must be taken because, as illustrated in FIG. 2B, if an external force Fx2 (206) is applied to a link other than the tool and an error in the position of the TCP is generated, the TCP velocity error vector Verr, which is obtained by differentiating the error with respect to time, may sharply increase and may reach a movement limit (singular point).

Figure 3A:
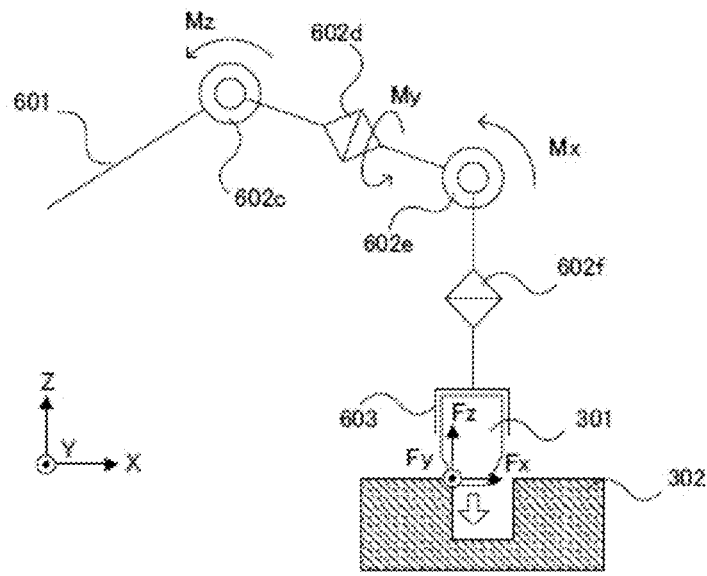
FIGS. 3A and 3B schematically illustrate cases in which the force control method according to the present invention is applied to a fitting operation.
Figure 3B:
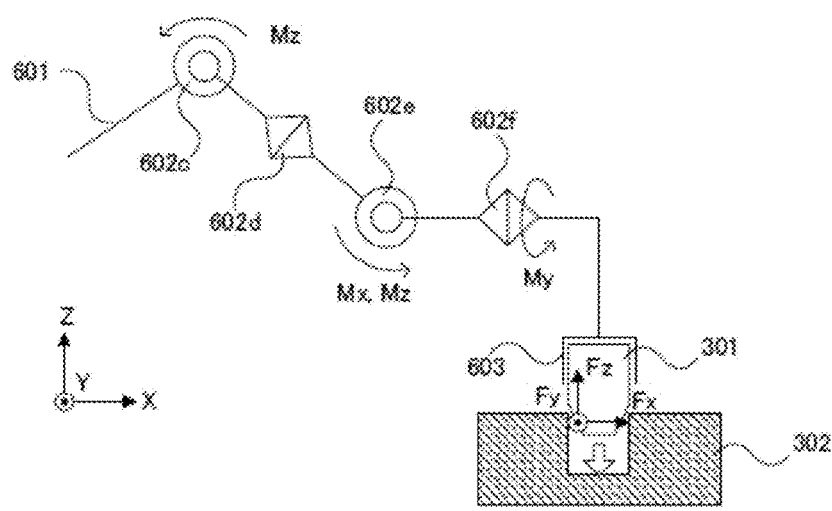

FIGS. 3A and 3B schematically illustrate cases in which the present invention is applied to a fitting operation. The same elements are represented by the same numerals as in FIG. 6, although the figures are expressed in a different manner. When a fitting part 301 held by the tool 603 is moved closer to a hole formed in a fitted part 302 from a non-contact state, the parts contact each other, and an external force is applied to the TCP.

Figure 4A:
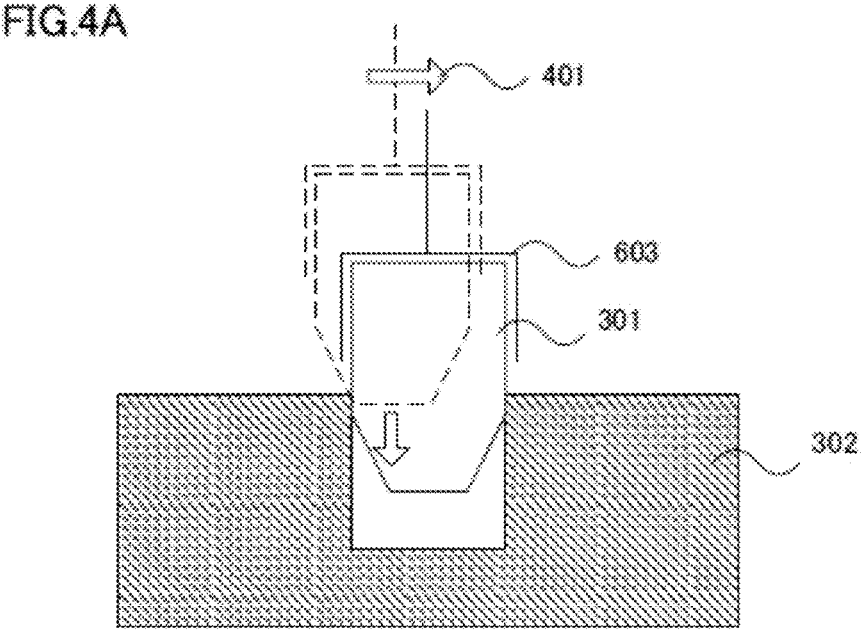
FIGS. 4A and 4B illustrate success and failure of the fitting operation.
Figure 4B:
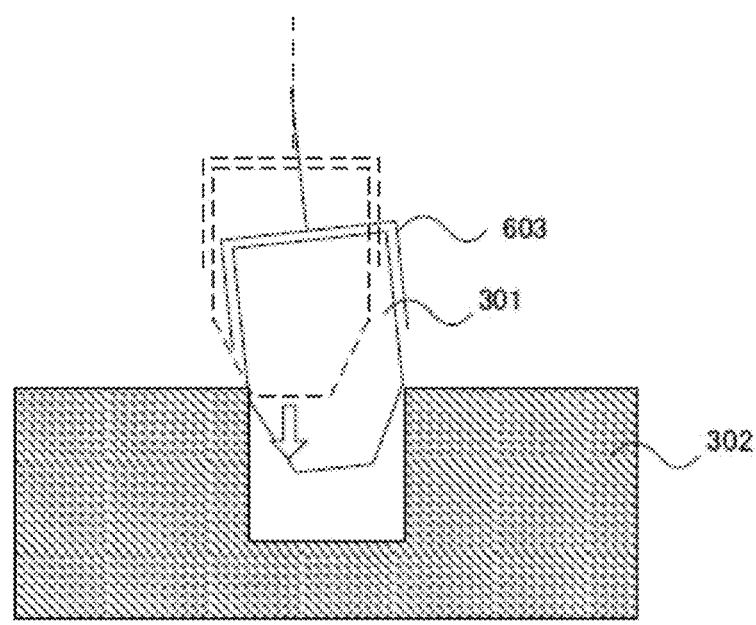

If the tool 603 is attached as illustrated in FIG. 3A, an external force Fx in the X direction applies a moment Mx to the B axis 602e. An external force Fy in the Y direction applies a moment My to an R axis 602d. Thus, owing to rotational following movements of the R and B axes, the wrist point performs translational following movement in the directions of the X and Y axes, and, as indicated by an arrow 401 in FIG. 4A, the fitting part 301 performs translational following movement toward the center axis of the hole in the fitted part 302. As a result, the center axis of the fitting part 301 and the center axis of the fitted part 302 coincide with each other, whereby the fitting part 301 is smoothly inserted. An external force Fz in the Z direction is absorbed by rotational following movement of the U axis 602c. Therefore, an excessive external force is not applied to the tool or the robot when the parts contact each other, whereby the tool and the robot are not broken. If the fitting operation is performed by using only rotational following movement of R and B axes without making the wrist point perform the translational following movement, the axes do not coincide with each other as illustrated in FIG. 4B, and the fitting part 301 becomes stuck in the hole in the fitted part 302, whereby the fitting part cannot be inserted into the hole.

FIG. 3B is different from FIG. 3A in that, in FIG. 3B, the tool 603 is mounted at an angle that is different by 90 degrees from that of FIG. 3A with respect to the rotation axis of the joint axis 602f. If the tool 603 is mounted as illustrated in FIG. 3B, the B and T axes perform rotational following movement so as to follow moments that are generated by an external force in the X and Y directions. An external force Fz in the Z direction is absorbed by rotational following movement of the U and B axes. However, the external force Fz is practically absorbed by the B axis because the static friction of the B axis is lower than that of the U axis.

The movement to follow the external force is realized by using the torque limiting function of the drive motors of the wrist axes. After following movement has been performed, the torque of an axis that received a moment is limited within a certain value. Therefore, the control system is in an open loop state, whereby the control system is intrinsically safe.

As heretofore described, according to the present embodiment, the TCP can be made to linearly follow even a small external force, because the wrist point is made to perform translational following movement by feeding back, to the main axes, the movement of the TCP owing to rotational following movement of the wrist axes that have a low static friction. Moreover, a fitting operation can be performed without using a force sensor. A safe control system can be established because the control system of the drive motors of the wrist axes are in an open loop state when following movement is performed. Furthermore, a collision force in a fitting direction can be absorbed by the torque limiting function of the axes, so that generation of an excessive force in a direction other than the following direction (fitting direction) is prevented.

Second Embodiment

As with the first embodiment, FIG. 1 illustrates a control block diagram of a force control method for a robot according to a second embodiment. The operation principle is about the same as that of the first embodiment, although the method of calculation is different.

In the second embodiment, a TCP velocity error vector Verr is a six-dimensional vector (three degree of freedom in position+three degrees of freedom in orientation), and can be calculated using equation (5).

$$Verr = [vex, vey, vez, rex, rey, rez]^T \quad (5)$$

Here, (rex, rey, rez) is a rotation velocity vector r from a TCP position vector 202 to a TCP position vector 203 (FIG. 2C).

The second calculation means 102 multiplies the TCP velocity error vector Verr by a 6×6 selection matrix represented by equation (6) from the left.

$$Msel2 = \begin{pmatrix} I33 & O33 \\ O33 & O33 \end{pmatrix} \quad (6)$$

Here, O33 is a 3×3 zero matrix.

The third calculation means 103 calculates a Jacobian matrix J66 (6×6 matrix) for the TCP with respect to all axes (S, L, U, R, B, and T), and, by using the J66, calculates a velocity error vector ωerr in the joint space using equation (7).

$$\omega err = inv(J66) \cdot Msel2 \cdot Verr \quad (7)$$

The fourth calculation means 104 integrates the velocity error vector ωerr in the joint space with respect to time so as to calculate a position correction amount vector θadd. The components of the position correction amount vector θadd are added to the position command θref of the position control system of all axes.

In the second embodiment, the control system operates so as to follow the translation velocity of the TCP, which is generated by the rotational following movement of the wrist axes, by using all axes including the main axes. At this time, because the effect of the rotation velocity vector r is neglected (set to be zero) in the selection matrix Msel2, the TCP does not additionally rotate owing to the translational following movement (so that the orientation of the TCP does not change). Therefore, the change in the orientation of TCP is smaller than that of the first embodiment.

Figure 5A:
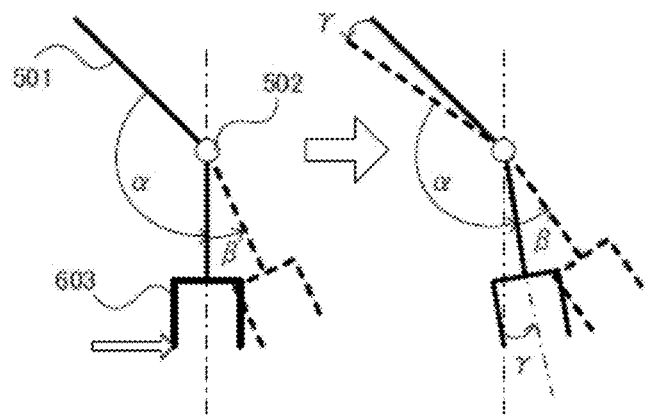
FIGS. 5A to 5C illustrate changes in the orientation of the TCP in an embodiment of the present invention.
Figure 5B:
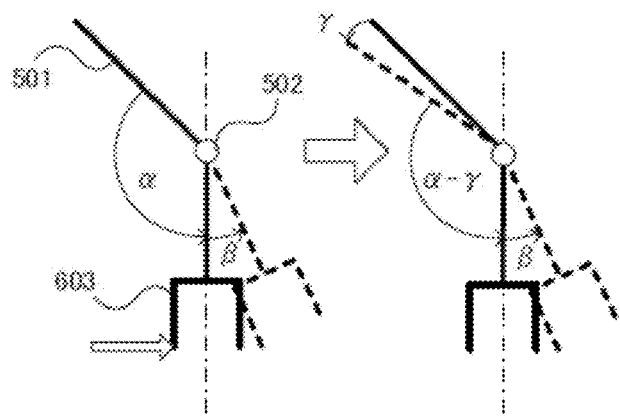
Figure 5C:
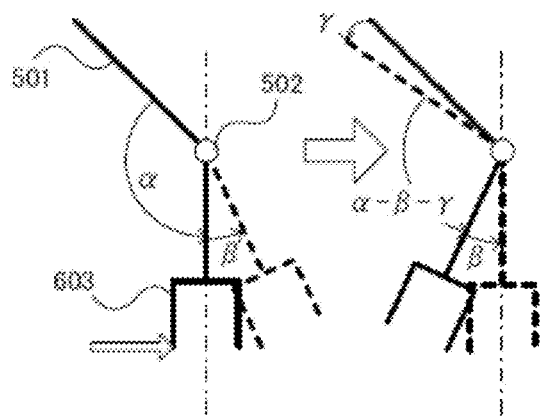

FIGS. 5A to 5C schematically illustrate the difference in the change in the orientation of the TCP. FIGS. 5A and 5B illustrate changes in the orientation of the TCP during translational following movement in the first embodiment and the second embodiment, respectively.

In FIGS. 5A to 5C, the robot 601 has a lower arm 501 and a wrist point 502. A solid line represents an orientation of the lower arm 501 and the tool 603 that is calculated from the position command. A dotted line represents an orientation of the lower arm 501 and the tool 603 after being changed by translational following movement of the wrist point or by rotational following movement of the wrist axes. The angle α is the angle between the lower arm 501 and the tool 603 that is calculated from the position command. The angle β is the rotation angle of the tool owing to rotational following movement of the wrist axes (B axis) that is performed when an external force is applied to the TCP. The angle γ is the rotation angle of the of the lower arm resulting from movement of the wrist point owing to translational following movement. In the first embodiment, translational following movement is realized by using only the main axes (S, L, and U) and the position command of the wrist axis is not corrected, so that the angle between the lower arm 501 and the tool 603, which is calculated from the position command, remains to be α. Therefore, the TCP orientation is changed by γ in addition to β.

On the other hand, in the second embodiment, translational following movement is realized by using all axes so that the orientation of the TCP does not change. Thus, the position command of the wrist axis is also corrected, whereby, as illustrated in FIG. 5B, the angle between the lower arm 501 and the tool 603, which is calculated from the position command, is α−γ. Therefore, the effect of the rotation γ of the lower arm is canceled out by the correction of the position command of the wrist axis, so that an additional change in the orientation of the TCP other than the rotational following movement β of the wrist axis does not occur.

As described above, according to the second embodiment, the change in the orientation of the TCP during translational following movement can be made smaller than that of the first embodiment. Therefore, a moment applied to the robot during a fitting operation can be reduced, whereby a more precise fitting operation can be realized.

Third Embodiment

As with the first and second embodiments, FIG. 1 illustrates a control block diagram of a force control method for a robot according to a third embodiment. The operation principle is similar to those of the first and second embodiments, although the method of calculation is slightly different.

As with the second embodiment, a TCP velocity error vector Verr is obtained from equation (5) in the third embodiment.

The second calculation means 102 multiplies the TCP velocity error vector Verr by a 6×6 selection matrix represented by equation (8) from the left.

$$Msel3 = \begin{pmatrix} I33 & O33 \\ O33 & -I33 \end{pmatrix} \quad (8)$$

The third calculation means 103 calculates a Jacobian matrix J66 (6×6 matrix) for the TCP with respect to all axes (S, L, U, R, B, and T), and, by using the J66, calculates a velocity error vector ωerr in the joint space using equation (9).

$$\omega err = inv(J66) \cdot Msel3 \cdot Verr \quad (9)$$

The fourth calculation means 104 integrates the velocity error vector ωerr in the joint space with respect to time so as to calculate a position correction amount vector θadd. All components of the position correction amount vector θadd are added to the position command θref of the position control systems of all axes.

In the third embodiment, the selection matrix is different from that of the second embodiment. In the second embodiment, the lower right block of the selection matrix Msel2 is O33 (3×3 zero matrix), so that the velocity of change in the orientation of the TCP owing to the rotational following movement of the wrist axes are neglected. In the third embodiment, as represented by equation (8), the lower right block of the selection matrix Msel3 is −I33, so that the direction (sign) of the velocity of change in the orientation of the TCP owing to the rotational following movement of the wrist axes are inverted and the TCP is made to perform translational following movement. Of the velocity error owing to the rotational following movement of the wrist axes, the direction (sign) of the velocity error with respect to the rotational movement is inverted, whereby a feedback is performed on all axes so as to cancel out the change in the orientation of the TCP owing to the rotational following movement of the wrist axes.

FIG. 5C illustrates a change in the orientation of the TCP during translational following movement according to the third embodiment. As a result of the translational following movement, the angle between the lower arm 501 and the tool 603 that is calculated from the position command becomes α−β−γ. Not only the rotation angle γ of the lower arm but also the rotation angle β of the tool (the change in the orientation of the TCP) owing to the rotational following movement of the wrist axis are canceled out. Therefore, the change in the orientation of the TCP during following movement is almost eliminated.

As described above, according to the third embodiment of the present invention, the change in the orientation of the TCP during translational following movement can be made smaller than that of the second embodiment, whereby a moment applied to the robot during a fitting operation can be further reduced and a more precise fitting operation can be realized.

What is claimed as new and is desired to be secured by Letters Patent of the United States is:

1. A robot system comprising:
   a robot including at least main axes and wrist axes;
   a first calculator configured to calculate a first velocity error vector of a tip of a tool of the robot, the first velocity error vector being generated as a result of the robot following an external force applied to the tool disposed at an end of the robot;
   a second calculator configured to output a second velocity error vector, the second velocity error vector including a vector component of the first velocity error vector that has been calculated, the vector component being related to translational movement;
   a third calculator configured to decompose the second velocity error vector that has been output into a joint velocity vector of the main axes;
   a fourth calculator configured to calculate a position correction amount vector by integrating the joint velocity vector that has been decomposed; and
   a position controller configured to generate a position command using the position correction amount vector and to control positions of drive motors of the robot on the basis of the position command.

2. The robot system according to claim 1,
   wherein the first calculator is configured to calculate the first velocity error vector by differentiating, with respect to time, a difference between a position vector calculated from the position command and a position vector calculated from position feedback.

3. The robot system according to claim 1,
   wherein the first velocity error vector comprises a velocity error vector in an orthogonal coordinate system.

4. A robot system comprising:
   a robot including at least main axes and wrist axes;
   a first calculator configured to calculate a first velocity error vector of a tip of a tool of the robot, the first velocity error vector being generated as a result of the robot following an external force applied to the tool disposed at an end of the robot;
   a second calculator configured to output a second velocity error vector, the second velocity error vector being obtained by selecting a vector component related to rotational movement in the first velocity error vector that has been calculated and by making a magnitude of the selected component zero;
   a third calculator configured to decompose the second velocity error vector that has been output into a joint velocity vector of the main axes and the wrist axes;
   a fourth calculator configured to calculate a position correction amount vector by integrating the joint velocity vector that has been decomposed; and
   a position controller configured to generate a position command using the position correction amount vector and to control positions of drive motors of the robot on the basis of the position command.

5. The robot system according to claim 4,
   wherein the first calculator is configured to calculate the first velocity error vector by differentiating, with respect to time, a difference between a position vector calculated from the position command and a position vector calculated from position feedback.

6. The robot system according to claim 2,
   wherein the first velocity error vector comprises a velocity error vector in an orthogonal coordinate system.

7. A robot system comprising:
   a robot including at least main axes and wrist axes;
   a first calculator configured to calculate a first velocity error vector of a tip of a tool of the robot, the first velocity error vector being generated as a result of the robot following an external force applied to the tool disposed at an end of the robot;
   a second calculator configured to output a second velocity error vector, the second velocity error vector being obtained by selecting a vector component related to rotational movement in the first velocity error vector that has been calculated and by inverting a sign of the selected component;
   a third calculator configured to decompose the second velocity error vector that has been output into a joint velocity vector of the main axes and the wrist axes;
   a fourth calculator configured to calculate a position correction amount vector by integrating the joint velocity vector that has been decomposed; and
   a position controller configured to generate a position command using the position correction amount vector and to control positions of drive motors of the robot on the basis of the position command.

8. The robot system according to claim 7,
   wherein the first calculator is configured to calculate the first velocity error vector by differentiating, with respect to time, a difference between a position vector calculated from the position command and a position vector calculated from position feedback.

9. The robot system according to claim 7,
   wherein the first velocity error vector comprises a velocity error vector in an orthogonal coordinate system.

10. A robot system comprising:
    a robot including at least main axes and wrist axes;
    means for calculating a first velocity error vector of a tip of a tool of the robot, the first velocity error vector being generated as a result of the robot following an external force applied to the tool disposed at an end of the robot;
    means for outputting a second velocity error vector, the second velocity error vector including a vector component of the first velocity error vector that has been calculated, the vector component being related to translational movement;
    means for decomposing the second velocity error vector that has been output into a joint velocity vector of the main axes;
    means for calculating a position correction amount vector by integrating the joint velocity vector that has been decomposed; and
    means for generating a position command using the position correction amount vector and for controlling positions of drive motors of the robot on the basis of the position command.

11. The robot system according to claim 10,
    wherein the means for calculating the first velocity error vector calculates the first velocity error vector by differentiating, with respect to time, a difference between a position vector calculated from the position command and a position vector calculated from position feedback.

12. The robot system according to claim 10, wherein the first velocity error vector comprises a velocity error vector in an orthogonal coordinate system.

13. A robot system comprising:
a robot including at least main axes and wrist axes;
means for calculating a first velocity error vector of a tip of a tool of the robot, the first velocity error vector being generated as a result of the robot following an external force applied to the tool disposed at an end of the robot;
means for outputting a second velocity error vector, the second velocity error vector being obtained by selecting a vector component related to rotational movement in the first velocity error vector that has been calculated and by making a magnitude of the selected component zero;
means for decomposing the second velocity error vector that has been output into a joint velocity vector of the main axes and the wrist axes;
means for calculating a position correction amount vector by integrating the joint velocity vector that has been decomposed; and
means for generating a position command using the position correction amount vector and for controlling positions of drive motors of the robot on the basis of the position command.

14. The robot system according to claim 13, wherein the means for calculating the first velocity error vector calculates the first velocity error vector by differentiating, with respect to time, a difference between a position vector calculated from the position command and a position vector calculated from position feedback.

15. The robot system according to claim 13, wherein the first velocity error vector comprises a velocity error vector in an orthogonal coordinate system.

16. A robot system comprising:
a robot including at least main axes and wrist axes;
means for calculating a first velocity error vector of a tip of a tool of the robot, the first velocity error vector being generated as a result of the robot following an external force applied to the tool disposed at an end of the robot;
means for outputting a second velocity error vector, the second velocity error vector being obtained by selecting a vector component related to rotational movement in the first velocity error vector that has been calculated and by inverting a sign of the selected component;
means for decomposing the second velocity error vector that has been output into a joint velocity vector of the main axes and the wrist axes;
means for calculating a position correction amount vector by integrating the joint velocity vector that has been decomposed; and
means for generating a position command using the position correction amount vector and for controlling positions of drive motors of the robot on the basis of the position command.

17. The robot system according to claim 16, wherein the means for calculating the first velocity error vector calculates the first velocity error vector by differentiating, with respect to time, a difference between a position vector calculated from the position command and a position vector calculated from position feedback.

18. The robot system according to claim 16, wherein the first velocity error vector comprises a velocity error vector in an orthogonal coordinate system.

* * * * *